United States Patent
Zhao et al.

(10) Patent No.: US 12,157,092 B1
(45) Date of Patent: Dec. 3, 2024

(54) SEAWATER DESALINATION REVERSE OSMOSIS MEMBRANE WITH BOTH WATER FLUX AND BORON REMOVAL RATE AND ITS PREPARATION METHOD THEREOF

(71) Applicant: CHINA AGRICULTURAL UNIVERSITY, Beijing (CN)

(72) Inventors: Changwei Zhao, Beijing (CN); Junliang Huang, Beijing (CN)

(73) Assignee: CHINA AGRICULTURAL UNIVERSITY (CN)

( * ) Notice: Subject to any disclaimer, the term of this patent is extended or adjusted under 35 U.S.C. 154(b) by 0 days.

(21) Appl. No.: 18/419,569

(22) Filed: Jan. 23, 2024

(30) Foreign Application Priority Data

Jun. 20, 2023 (CN) .......................... 202310731766.6

(51) Int. Cl.

| | | |
|---|---|---|
| *B01D 67/00* | (2006.01) | |
| *B01D 69/02* | (2006.01) | |
| *B01D 71/56* | (2006.01) | |
| *B01D 71/68* | (2006.01) | |
| *C02F 1/44* | (2023.01) | |
| *C08G 69/28* | (2006.01) | |
| *C08G 69/32* | (2006.01) | |
| *C08J 7/04* | (2020.01) | |
| *C09D 177/06* | (2006.01) | |
| *C02F 103/08* | (2006.01) | |

(52) U.S. Cl.
CPC ....... *B01D 67/00933* (2022.08); *B01D 69/02* (2013.01); *B01D 71/56* (2013.01); *B01D 71/68* (2013.01); *C02F 1/441* (2013.01); *C08G 69/28* (2013.01); *C08G 69/32* (2013.01); *C08J 7/0427* (2020.01); *C09D 177/06* (2013.01); *B01D 2323/081* (2022.08); *B01D 2325/34* (2013.01); *C02F 2103/08* (2013.01); *C08J 2381/06* (2013.01); *C08J 2477/06* (2013.01)

(58) Field of Classification Search
None
See application file for complete search history.

(56) References Cited

U.S. PATENT DOCUMENTS

| | | | | |
|---|---|---|---|---|
| 2010/0264364 | A1* | 10/2010 | Wagner | B82Y 30/00 252/182.12 |
| 2014/0014576 | A1* | 1/2014 | Jeong | B01D 61/025 427/407.1 |
| 2019/0282967 | A1* | 9/2019 | Zhang | B01D 67/0002 |

FOREIGN PATENT DOCUMENTS

CN 113413768 A * 9/2021

OTHER PUBLICATIONS

Zhou et al. Tuning the Surface Structure of Polyamide Membranes Using Porous Carbon Nitride Nanoparticles for High-Performance Seawater Desalination. Membranes 2020, 10, 163 (Year: 2020).*
Author—Zongyao Zhou, Xiang Li, Digambar B. Shinde, Guan Sheng, Dongwei Lu, Peipei Li and Zhiping Lai Title of Article—Tuning the Surface Structure of Polyamide MembranesUsing Porous Carbon Nitride Nanoparticles forHigh-Performance Seawater Desalination Title of book / Magazine / Journaletc.—membranes Date (Month, date, year)—Jul. 24, 2020.

* cited by examiner

*Primary Examiner* — David P Turocy

(57) ABSTRACT

A method for creating a seawater desalination reverse osmosis membrane that excels in both water flux and boron removal. The method utilizes the abundant and reactive amino groups of carbon nitride in an interfacial polymerization reaction to enhance the membrane's structure. The unique pore and interlayer structure of carbon nitride is employed to modify the membrane's hydrophilicity, roughness, and interlayer structure, thereby boosting its water flux and boron removal capabilities. Additionally, the carbon nitride solution demonstrates exceptional dispersion properties. Its hydrophilic amino groups react with the organic phase monomer trimesoyl chloride during polymerization, ensuring an even distribution in the polyamide layer without any agglomeration. The evenly dispersed m-phenylenediamine and carbon nitride solution, along with sodium hydroxide in the aqueous phase, quicken the acylation reaction rate. This not only ensures more uniform participation of carbon nitride in the reaction but also further enhances the membrane's water flux and boron removal efficiency.

8 Claims, No Drawings

SEAWATER DESALINATION REVERSE OSMOSIS MEMBRANE WITH BOTH WATER FLUX AND BORON REMOVAL RATE AND ITS PREPARATION METHOD THEREOF

TECHNICAL FIELD

The present invention relates to the technical field of separation membrane materials, in particular to a seawater desalination reverse osmosis membrane with both water flux and boron removal rate and a preparation method thereof.

BACKGROUND ART

Seawater desalination is an effective way to solve the shortage of drinking water, reverse osmosis is currently the most commonly used seawater desalination technology, however, in practical applications, the boron removal rate of conventional seawater desalination reverse osmosis membranes is generally less than 60%, the boron concentration in the effluent is difficult to meet the requirements of China's current 'Sanitary Standard for Drinking Water' (GB5749-2022) (<1.0 mg L), and the water flux of conventional seawater desalination reverse osmosis membrane is not high, generally around 0.5 $L \cdot m^{-2} \cdot h^{-1} \cdot bar^{-1}$. Up to now, to improve the deboronization performance and water flux of seawater desalination reverse osmosis membrane, researchers have made many attempts to regulate the physical and chemical properties and structure of the reverse osmosis membrane surface, such as surface charge, hydrophilicity, roughness, pore structure, etc. Carbon-based materials can adjust the hydrophilicity, roughness and interlayer structure of the membrane surface due to their rich functional groups, special interlayer structure and pore structure, it has great potential in improving the boron removal rate and permeability of reverse osmosis membrane. However, there are many kinds of carbon-based materials with different properties, how to screen suitable carbon-based materials and realize the controllable preparation of high boron removal and high flux reverse osmosis membranes remains to be further explored.

SUMMARY

The purpose of the present invention is to provide a preparation method thereof for seawater desalination reverse osmosis membrane with both water flux and boron removal rate. The method provided by the present invention adopts the interfacial polymerization method on the reverse osmosis base membrane, introduces the carbon nitride solution with good dispersibility into the polyamide layer, improves the water flux and boron removal performance of the seawater desalination reverse osmosis membrane, and prepares the seawater desalination reverse osmosis membrane with both water flux and boron removal rate.

To achieve the above invention purpose, the present invention provides the following technical scheme:

the present invention provides a preparation method thereof for seawater desalination reverse osmosis membrane with both water flux and boron removal rate, including the following steps:

(1) after mixing the carbon nitride sol and deionized water, obtaining a carbon nitride solution by a first stirring;

(2) mixing the carbon nitride solution obtained by the step (1) with m-phenylenediamine aqueous solution and sodium hydroxide, and obtaining an aqueous solution by a second stirring;

(3) after mixing trimesoyl chloride and organic solvent, obtaining an organic liquid phase by a third stirring;

there is no sequence between steps (2) and (3);

(4) immersing a reverse osmotic basement membrane into the aqueous solution obtained by the step (2), and then removing the immersed reverse osmotic basement membrane, rolling dry surface solution with a rubber roller, then immersing into the organic liquid phase obtained in step (3) for interfacial polymerization, and obtaining a reverse osmotic basement membrane after interfacial polymerization;

immersing the reverse osmotic basement membrane after interfacial polymerization in a n-hexane solvent for standing, and then performing heat treatment and cooling in turn to obtain a seawater desalination reverse osmosis membrane with both water flux and boron removal rate.

Preferably, a first stirring time in step (1) is 50~130 min, a first stirring temperature is 10~30° C., and a first stirring speed is 800~1500 rpm.

Preferably, a concentration of the carbon nitride solution in step (1) is 1,000~10,000 mg/L.

Preferably, in step (2), a concentration of m-phenylenediamine in the aqueous solution is 0.1 wt %~4.0 wt %.

Preferably, in step (2), a concentration of carbon nitride in the aqueous phase solution is 25~500 mg/L; a concentration of sodium hydroxide in the aqueous solution is 0.1 wt %~1.0 wt %.

Preferably, a concentration of trimesoyl chloride in the organic liquid phase in step (3) is 0.1 wt %~0.5 wt %.

Preferably, in step (4), the reverse osmotic basement membrane is a polysulfone ultrafiltration membrane or a polyethersulfone ultrafiltration membrane; a molecular weight cut-off of the reverse osmotic basement membrane is 30 KDa~150 KDa.

Preferably, in the step (4), firstly immersing the reverse osmotic basement membrane in the aqueous solution for 1~4 min, and then taking the immersed reverse osmotic basement membrane out, rolling dry surface solution with the rubber roller, and then immersing in the organic liquid phase for interfacial polymerization reaction for 0.5~2 min.

Preferably, a temperature of heat treatment in step (4) is 90~110° C., and a time of heat treatment is 2~5 min.

The present invention also provides a seawater desalination reverse osmosis membrane with both water flux and boron removal rate prepared by the preparation method described in the above technical scheme.

The present invention provides a preparation method thereof for seawater desalination reverse osmosis membrane with both water flux and boron removal rate, the aqueous solution is prepared by using the prepared carbon nitride solution, the m-phenylenediamine aqueous solution and sodium hydroxide, the organic phase solution is prepared by trimesoyl chloride and organic solvent, using the reverse osmotic basement membrane as a support body, immersing the reverse osmotic basement membrane in the aqueous solution, making the aqueous solution containing carbon nitride, m-phenylenediamine monomer and sodium hydroxide be fully in contact with the reverse osmotic basement membrane, it is adsorbed on the surface of the reverse osmotic basement membrane, and then removing the immersed reverse osmotic basement membrane, rolling dry surface solution with the rubber roller, removing the residual aqueous solution on the membrane surface to make the subsequent interfacial polymerization reaction more uniform, and then immersing in the organic phase solution to make the carbon nitride and m-phenylenediamine monomers adsorbed on the surface of the reverse osmotic basement membrane fully contact with the trimesoyl chloride monomer in the organic phase solution and polymerize at the two-phase interface, forming a polyamide layer on the basement membrane, and then performing a heat treatment to further crosslink the formed polyamide layer to improve its compactness and stability, after cooling, a seawater desalination reverse osmosis membrane with both water flux and boron removal rate is obtained. In this invention, by introducing the carbon nitride solution into the polyamide layer, and using the rich and reactive amino groups of carbon nitride to participate in the interfacial polymerization reaction to improve the membrane structure, using the special pore structure and interlayer structure of carbon nitride to adjust the hydrophilicity, roughness and interlayer structure of the membrane surface, so as to improve the water flux and boron removal performance of the reverse osmosis membrane, the seawater desalination reverse osmosis membrane with both water flux and boron removal rate is prepared, moreover, the carbon nitride solution has excellent dispersion performance, and the rich hydrophilic amino group at the end can react with the organic phase monomer trimesoyl chloride during the interfacial polymerization process, so that it is more evenly distributed in the polyamide layer and no agglomeration occurs at all; the uniformly dispersed m-phenylenediamine and carbon nitride solution in the aqueous solution, as well as sodium hydroxide, accelerate the acylation reaction speed, and also enable carbon nitride to participate in the reaction more evenly, so that the seawater desalination reverse osmosis membrane prepared by the present invention has higher water flux and boron removal rate; the reverse osmotic basement membrane after interfacial polymerization is immersed in n-hexane solvent for standing, and the residual unreacted trimesoyl chloride monomer on the membrane surface could be rinsed off, which is beneficial to improve the uniformity of the membrane and improve the comprehensive performance of the prepared membrane. The results of the implementation examples show that the pure water flux of the seawater desalination reverse osmosis membrane with both water flux and boron removal rate prepared by the implementation examples 1 to 7 of the present invention can reach 2.03 $Lm^{-2}h^{-1}bar^{-1}$, and the simulated seawater flux can reach 0.80 $Lm^{-2}h^{-1}bar^{-1}$, the desalination rate of simulated seawater can reach 98.14%, and the boron removal rate of simulated seawater can reach 82.46%, which is generally higher than the seawater desalination reverse osmosis membrane without carbon nitride modification prepared at a ratio of 1 to 7.

DETAILED DESCRIPTION OF THE EMBODIMENTS

The present invention provides a preparation method thereof for seawater desalination reverse osmosis membrane with both water flux and boron removal rate, including the following steps:
(1) after mixing the carbon nitride sol and deionized water, obtaining a carbon nitride solution by a first stirring;
(2) mixing the carbon nitride solution obtained by the step (1) with m-phenylenediamine aqueous solution and sodium hydroxide, and obtaining an aqueous solution by a second stirring;
(3) after mixing trimesoyl chloride and organic solvent, obtaining an organic liquid phase by a third stirring; there is no sequence between steps (2) and (3);
(4) immersing a reverse osmotic basement membrane into the aqueous solution obtained by the step (2), and then removing the immersed reverse osmotic basement membrane, rolling dry surface solution with a rubber roller, then immersing into the organic liquid phase obtained in step (3) for interfacial polymerization, and obtaining a reverse osmotic basement membrane after interfacial polymerization;
immersing the reverse osmotic basement membrane after interfacial polymerization in a n-hexane solvent for standing, and then performing heat treatment and cooling in turn to obtain a seawater desalination reverse osmosis membrane with both water flux and boron removal rate.

In the present invention, if there is no special description, the raw materials used are conventional commercially available products in this field.

In the present invention, the carbon nitride sol is mixed with deionized water and stirred for the first time to obtain a carbon nitride solution.

In the present invention, the carbon nitride sol is preferably obtained by alkali treatment of carbon nitride. In the present invention, the preferred alkali treatment includes: mixing the powdered carbon nitride with 3 mol/L sodium hydroxide solution, obtaining a mixture of carbon nitride with a concentration of 25 mg/mL, transferring the mixture into a conical bottle, heating and stirring at 60° C. for 12 h, and performing an ultrasound for 1 h for every 3 h of heating, then putting the mixture obtained by heating and stirring into a 3500 Da dialysis bag, repeatedly changing water, dialysis for several days to neutral, after the calibration content to obtain a specific concentration of carbon nitride sol.

In this invention, the powdered carbon nitride is preferably prepared by conventional commercially available products in this field or by laboratory preparation according to the well-known methods in this field.

In the invention, the first stirring time is preferably 50~130 min; the temperature of the first stirring is preferably 10~30° C.; the speed of the first stirring is preferably 800~1,500 rpm. The present invention obtains a carbon nitride solution with excellent dispersibility through the first stirring.

In the invention, the carbon nitride solution is preferably stored in a refrigerator at 4° C.; the validity period of the preservation is preferably 2~3 months.

In the invention, the concentration of the carbon nitride solution is preferably 1,000~10,000 mg/L.

After obtaining the carbon nitride solution, the invention mixes the carbon nitride solution with the m-phenylenediamine aqueous solution and sodium hydroxide, and performs a second stirring to obtain an aqueous phase solution.

In the invention, the method of mixing the carbon nitride solution with the m-phenylenediamine aqueous solution and sodium hydroxide is preferred to mix the m-phenylenediamine and partially deionized water to obtain the m-phenylenediamine aqueous solution, and then add the carbon nitride solution and sodium hydroxide, and then add the remaining deionized water.

In the invention, the second stirring time is preferably 15~30 min; the rotation speed of the second stirring is preferably 900~1,100 rpm, and more preferably 1,000 rpm. The invention obtains an aqueous phase solution with excellent dispersibility by the second stirring.

In the invention, the concentration of m-phenylenediamine in the aqueous phase solution is preferably 0.1 wt %~4.0 wt %.

In the invention, the concentration of carbon nitride in the aqueous phase solution is preferably 25~500 mg/L; the concentration of sodium hydroxide in the aqueous solution is preferably 0.1 wt %~1.0 wt %. The invention controls the concentration of m-phenylenediamine, carbon nitride and sodium hydroxide in the aqueous solution in the above corresponding range to speed up the interfacial polymerization reaction (i.e. acylation reaction), form a dense defect-free polyamide layer, and improve the hydrophilicity of the membrane surface.

In the invention, trimesoyl chloride and organic solvent are mixed and stirred for the third time to obtain an organic phase solution.

In the invention, the organic solvent is preferably n-hexane.

In this invention, the concentration of trimesoyl chloride in the organic phase solution is preferably 0.1 wt %~0.5 wt %. The present invention controls the concentration of trimesoyl chloride in the organic phase solution in the above range to provide sufficient and appropriate amount of acyl chloride monomer to react with m-phenylenediamine, carbon nitride and sodium hydroxide in the aqueous phase solution.

In the invention, the third stirring time is preferably 15~30 min; the third stirring speed is preferably 900~1,100 rpm, preferably 1,000 rpm. The present invention obtains a uniformly mixed organic phase solution by the third stirring.

In the invention, the preparation of the aqueous solution and the organic phase solution has no sequence.

After obtaining the aqueous solution and the organic phase solution, immersing the reverse osmotic basement membrane is immersed in the aqueous solution, and then removing the immersed reverse osmotic basement membrane, rolling dry surface solution with a rubber roller, then immersing into the organic phase solution for interfacial polymerization reaction, and the reverse osmotic basement membrane after interfacial polymerization is obtained.

In the present invention, the reverse osmotic basement membrane is preferably a polysulfone ultrafiltration membrane or a polyethersulfone ultrafiltration membrane; the molecular weight cut-off of the reverse osmotic basement membrane is preferably 30 KDa~150 KDa. The present invention controls the molecular weight cut-off of the reverse osmosis base membrane in the above range, so that the reverse osmosis base membrane has sufficient porosity and suitable pore size, and has excellent mechanical strength and compressive performance to meet the higher test pressure of the reverse osmosis membrane.

In the present invention, the reverse osmotic basement membrane is preferably pretreated before use: the pretreatment steps preferably include: cutting the reverse osmotic basement membrane and soaking in deionized water in turn, replacing the deionized water every 12 h during the immersion in deionized water. In the invention, the soaking time of the deionized water is preferably 46~50 h, and the soaking time is preferably 48 h.

Firstly immersing the reverse osmotic basement membrane in an aqueous solution for 1~4 min, removing the immersed reverse osmotic basement membrane, rolling dry surface solution with a rubber roller, then immersing in the organic phase solution for interfacial polymerization reaction for 0.5~2 min, preferably firstly immersing the reverse osmotic basement membrane in an aqueous solution for 1~2 min, removing the immersed reverse osmotic basement membrane, rolling dry surface solution with a rubber roller, then immersing in the organic phase solution for interfacial polymerization reaction for 1~1.5 min.

After obtaining the reverse osmotic basement membrane after interfacial polymerization, the reverse osmotic basement membrane after interfacial polymerization is immersed in n-hexane solvent for standing, and then subjected to heat treatment and cooling in turn to obtain a seawater desalination reverse osmosis membrane that takes into account water flux and boron removal rate.

In the present invention, the standing time is preferably 9~12 s, and preferably 10 s; the standing temperature is preferably room temperature. The invention may rinse off the unreacted trimesoyl chloride monomer remaining on the membrane surface by standing, which is beneficial to improve the uniformity of the membrane and improve the comprehensive performance of the prepared membrane.

In the present invention, the heat treatment temperature is preferably 90~110° C.; the heat treatment time is preferably 2~5 min. Through heat treatment, the formed polyamide layer is further cross-linked to improve its compactness and stability.

The present invention has no special restriction on the cooling method, and the conventional technical scheme in this field can be used to cool to room temperature.

In this invention, the seawater desalination reverse osmosis membrane with both water flux and boron removal rate is preferably sealed and stored in deionized water.

The preparation method of seawater desalination reverse osmosis membrane with both water flux and boron removal rate provided by the invention is simple in operation, mild in reaction conditions, and suitable for large-scale production.

The invention also provides a seawater desalination reverse osmosis membrane with both water flux and boron removal rate prepared by the preparation method described in the above technical scheme.

The following will combine the implementation examples in the invention to clearly and completely describe the technical scheme in the invention. Obviously, the described embodiments are only part of the embodiments of the invention, not all of the embodiments. Based on the embodiments in the invention, all other embodiments obtained by ordinary technicians in the field without making creative labor are within the scope of protection of the invention.

Example 1

The preparation method of seawater desalination reverse osmosis membrane taking into account water flux and boron removal rate is as follows (the following steps without temperature are carried out at room temperature):

(1) carbon nitride sol with a concentration of 6500 mg/L is obtained by alkali treatment of carbon nitride; taking the 23.077 mL of the above carbon nitride sol in a beaker, adding deionized water to 100 g, and placing on a magnetic stirrer, performing a first stirring at 1,000 rpm for 60 min to obtain a uniformly dispersed carbon nitride solution with a concentration of 1500 mg/L;

(2) taking 3.5 g of m-phenylenediamine in a beaker, adding 50 g of deionized water, and then adding 1.667 mL of the carbon nitride solution and 0.3 g of sodium hydroxide obtained in the steps (1), and then adding deionized water to 100 g, placing on the magnetic stirrer, performing the second stirring at 1,000 rpm for 15~30 min, and obtaining the aqueous solution containing 3.5 wt % m-phenylenediamine, 25 mg/L carbon nitride and 0.3 wt % sodium hydroxide;

(3) dissolving 0.1 g trimesoyl chloride in 100 g n-hexane, performing the second stirring at 1,000 rpm for 15~30 min to make it completely dissolved, and obtaining the organic phase solution of trimesoyl chloride with a concentration of 0.1 wt %;

there is no sequence between steps (2) and (3);

(4) using the polyethersulfone (PES) ultrafiltration membrane with a molecular weight cut-off of 100 KDa as the reverse osmotic basement membrane, cutting into a square with a size of 7 cm×7 cm, and then immersing in deionized water for 48 h, during the immersion in deionized water, replacing deionized water every 12 h to obtain a pretreated reverse osmotic basement membrane;

the pretreated reverse osmotic basement membrane is clipped with tweezers, and the surface moisture is absorbed with a paper towel, immersing in the aqueous solution obtained by step (2) for 2 min, removing the immersed reverse osmotic basement membrane, rolling dry surface solution with a rubber roller, then putting into the organic phase solution obtained in step (3) for 1 min, performing interfacial polymerization reaction, after that, taking the reverse osmotic basement membrane out after the interfacial polymerization reaction was taken out, and then placed in 100 g of n-hexane solvent for 10 s; after evaporation of n-hexane on the membrane surface, putting the membrane into an oven, heat-treated at 100° C. for 3 min and then taken out, after cooling, sealing the membrane in deionized water to obtain a seawater desalination reverse osmosis membrane with both water flux and deboronization rate.

The seawater desalination reverse osmosis membrane with both water flux and boron removal rate prepared in Example 1 is placed in deionized water for at least 24 h, under the pressure of 5.5 MPa, the performance of seawater desalination reverse osmosis membrane with both water flux and boron removal rate prepared in Example 1 was tested with deionized water and artificially prepared simulated seawater, respectively, wherein, the preparation steps of artificially prepared simulated seawater are: dissolving 265.18 g NaCl, 7.25 g KCl, 11.41 g $CaCl_2$), 33.05 g $MgSO_4 \cdot 7H_2O$, 24.47 g $MgCl_2 \cdot 6H_2O$, 2.02 g $NaHCO_3$, 0.83 g NaBr, 0.286 g $H_3BO_3$ in deionized water, the conductivity of the simulated seawater is 42,380 μS/cm, and the boron concentration is 5 mg/L. Through the high pressure flat membrane test instrument, the pure water flux of the seawater desalination reverse osmosis membrane prepared by the implementation of the water flux and the boron removal rate is 1.91 $Lm^{-2}h^{-1}bar^{-1}$, and the simulated seawater flux is 0.72 $Lm^{-2}h^{-1}bar^{-1}$, the conductivity tester is used to test and calculate the desalination rate of the simulated seawater which is 97.82%, and the boron removal rate of the simulated seawater is 71.87%.

Example 2

The seawater desalination reverse osmosis membrane with both water flux and boron removal rate is prepared according to the method of the example 1, different from the example 1, 3.333 mL of carbon nitride solution is added in the step (2), and the concentration of carbon nitride in the aqueous phase solution is 50 mg/L.

The performance test is performed by the same method as that of case 1, and the pure water flux, simulated seawater flux, simulated seawater desalination rate and simulated seawater desalination rate of the seawater desalination reverse osmosis membrane prepared by example 2 are obtained, the specific results are shown in Table 1.

Example 3

The seawater desalination reverse osmosis membrane with both water flux and boron removal rate is prepared according to the method of example 1, different from the implementation example 1, 6.666 mL of carbon nitride solution is added in the step (2), and the concentration of carbon nitride in the aqueous phase solution is 100 mg/L.

The performance test is performed by the same method as that of the example 1, and the pure water flux, simulated seawater flux, simulated seawater desalination rate and simulated seawater desalination rate of the seawater desalination reverse osmosis membrane prepared by the example 3 are obtained, the specific results are shown in Table 1, and the concentration of boron in the effluent is 0.877 mg/L, which meets the requirements of China's current 'Drinking Water Health Standard' (GB5749-2022) (<1.0 mg/L).

Example 4

The seawater desalination reverse osmosis membrane with both water flux and boron removal rate was prepared according to the method of example 1, different from the example 1, 10.000 mL of carbon nitride solution was added in the step (2), and the concentration of carbon nitride in the aqueous phase solution is 150 mg/L.

The performance test was carried out by the same method as that of example 1, and the pure water flux, simulated seawater flux, simulated seawater desalination rate and simulated seawater desalination rate of the seawater desalination reverse osmosis membrane prepared by case 4 are obtained. The specific results are shown in Table 1.

Example 5

The seawater desalination reverse osmosis membrane with both water flux and boron removal rate is prepared according to the method of example 1, different from the implementation example 1, 13.333 mL of carbon nitride solution is added in the step (2), and the concentration of carbon nitride in the aqueous phase solution is 200 mg/L.

The performance test is performed by the same method as that of example 1, and the pure water flux, simulated seawater flux, simulated seawater desalination rate and simulated seawater desalination rate of seawater desalination reverse osmosis membrane prepared by example 5 are obtained, the specific results are shown in Table 1.

Example 6

The seawater desalination reverse osmosis membrane with both water flux and boron removal rate is prepared according to the method of example 1, different from the implementation example 1, 16.666 mL of carbon nitride solution is added in the step (2), and the concentration of carbon nitride in the aqueous phase solution is 250 mg/L.

The performance test was carried out by the same method as the example 1, and the pure water flux, simulated seawater flux, simulated seawater desalination rate and simulated seawater desalination rate of the seawater desalination reverse osmosis membrane prepared by the example 6 are obtained, the specific results are shown in Table 1.

Example 7

The seawater desalination reverse osmosis membrane with both water flux and boron removal rate is prepared according to the method of example 1, different from the implementation example 1, 20.000 mL of carbon nitride solution is added in the step (2), and the concentration of carbon nitride in the aqueous phase solution is 300 mg/L.

The performance test is performed by the same method as that of example 1, and the pure water flux, simulated seawater flux, simulated seawater desalination rate and simulated seawater desalination rate of the seawater desalination reverse osmosis membrane prepared by example 7 are obtained, the specific results are shown in Table 1.

Ratio 1

The preparation method of seawater desalination reverse osmosis membrane without carbon nitride modification is as follows: (the following steps without temperature are performed at room temperature.)

(1) taking 3.5 g of m-phenylenediamine in a beaker, adding 50 g of deionized water, then adding 0.1 g of sodium hydroxide, and then adding deionized water to 100 g, placing it on a magnetic stirrer, and stirring at 1,000 rpm for 15~30 min to obtain an aqueous solution containing 3.5 wt % of m-phenylenediamine and 0.1 wt % of sodium hydroxide;

(2) 0.1 g of trimesoyl chloride is dissolved in 100 g of n-hexane solvent, and stirred at 1,000 rpm for 15~30 min to completely dissolve it to obtain an organic phase solution with a trimesoyl chloride concentration of 0.1 wt %;

(3) pretreatment of reverse osmotic basement membrane: the polyethersulfone (PES) ultrafiltration membrane with a molecular weight cut-off of 100 KDa is used as a reverse osmosis base membrane, cut into a square with a size of 7 cm×7 cm, and immersed in deionized water for 48 h, during the immersion in deionized water, deionized water is replaced every 12 h to obtain a pretreated reverse osmotic basement membrane;

the pretreated reverse osmosis base membrane is clipped with tweezers, and the surface moisture is dried with a paper towel, and then immersed in the step (1) to obtain the aqueous phase solution for 2 min, and the immersed reverse osmotic basement membrane is taken out, after the surface solution of the dry film surface of the rubber roller was used to dry the film surface, it is immersed in the step (2) to obtain the organic phase solution for 1 min, and the interfacial polymerization reaction was carried out, the reverse osmotic basement membrane after the interfacial polymerization reaction is taken out, and then it is placed in 100 g of n-hexane solvent for 10 s, after the n-hexane on the surface of the membrane was volatilized, it is placed in the oven and heat-treated at 100° C. for 3 min, after cooling, it is sealed in deionized water to obtain a seawater desalination reverse osmosis membrane without carbon nitride modification.

After the seawater desalination reverse osmosis membrane without carbon nitride modification prepared by ratio 1 is placed in deionized water for at least 24 h, the performance of the seawater desalination reverse osmosis membrane without carbon nitride modification prepared by ratio 1 is tested according to the same method as example 1, the specific results are shown in Table 1.

Ratio 2

According to the method of ratio 1, the seawater desalination reverse osmosis membrane without carbon nitride modification is prepared, different from the ratio 1, 0.2 g sodium hydroxide is added to the step (1), and the concentration of sodium hydroxide in the aqueous solution is 0.2 wt %.

According to the same method as the ratio 1, the performance of the seawater desalination reverse osmosis membrane prepared by the ratio 2 without carbon nitride modification is tested, the specific results are shown in Table 1.

Ratio 3

According to the method of ratio 1, the reverse osmosis membrane of seawater desalination without carbon nitride modification is prepared, different from the method of ratio 1, 0.3 g sodium hydroxide is added to the step (1), and the concentration of sodium hydroxide in the aqueous phase solution is 0.3 wt %.

According to the same method as the ratio 1, the performance of the seawater desalination reverse osmosis membrane prepared by the ratio 3 without carbon nitride modification is tested. The specific results are shown in Table 1.

Ratio 4

According to the method of ratio 1, the seawater desalination reverse osmosis membrane without carbon nitride modification is prepared. different from the method of ratio 1, 0.4 g sodium hydroxide is added to the step (1), and the concentration of sodium hydroxide in the aqueous phase solution is 0.4 wt %.

According to the same method as the ratio 1, the performance of the seawater desalination reverse osmosis membrane prepared by the ratio 4 without carbon nitride modification is tested, the specific results are shown in table 1.

Ratio 5

According to the method of ratio 1, the seawater desalination reverse osmosis membrane without carbon nitride modification is prepared, different from the method of ratio 1, 0.5 g sodium hydroxide is added to the step (1), and the concentration of sodium hydroxide in the aqueous phase solution is 0.5 wt %.

According to the same method as the ratio 1, the performance of the seawater desalination reverse osmosis membrane prepared by the ratio 5 without carbon nitride modification is tested, the specific results are shown in table 1.

Ratio 6

According to the method of ratio 1, the seawater desalination reverse osmosis membrane without carbon nitride modification is prepared, different from the method of ratio 1, 0.6 g sodium hydroxide is added to the step (1), and the concentration of sodium hydroxide in the aqueous phase solution is 0.6 wt %.

According to the same method as the ratio 1, the performance of the seawater desalination reverse osmosis membrane prepared by the ratio 6 without carbon nitride modification is tested, and the specific results are shown in table 1.

Ratio 7

According to the method of ratio 1, the seawater desalination reverse osmosis membrane without carbon nitride modification is prepared, different from the method of ratio 1, 0.7 g sodium hydroxide is added to the step (1), and the concentration of sodium hydroxide in the aqueous phase solution is 0.7 wt %.

According to the same method as the ratio 1, the performance of the seawater desalination reverse osmosis membrane prepared by the ratio 7 without carbon nitride modification is tested, the specific results are shown in the table.

Table 1 Performance statistics of seawater desalination reverse osmosis membranes with both water flux and boron removal rate prepared by case 1~7 and seawater desalination reverse osmosis membranes without carbon nitride modified prepared by ratio 1~7.

| Performance | Pure water flux (Lm$^{-2}$ h$^{-1}$bar$^{-1}$) | Simulated seawater flux (Lm$^{-2}$ h$^{-1}$bar$^{-1}$) | Desalination rate of simulated seawater (%) | Boron removal rate of simulated seawater (%) |
|---|---|---|---|---|
| Example 1 | 1.91 | 0.72 | 97.82 | 71.87 |
| Example 2 | 1.95 | 0.82 | 97.31 | 73.14 |
| Example 3 | 2.03 | 0.80 | 98.14 | 82.46 |
| Example 4 | 2.05 | 0.84 | 98.47 | 76.25 |
| Example 5 | 1.95 | 0.74 | 98.17 | 75.94 |
| Example 6 | 2.16 | 0.74 | 98.03 | 73.04 |
| Example 7 | 1.91 | 0.72 | 84.06 | 58.52 |
| Ratio 1 | 1.37 | 0.60 | 97.91 | 73.90 |
| Ratio 2 | 1.58 | 0.67 | 97.17 | 73.20 |
| Ratio 3 | 1.64 | 0.76 | 95.84 | 71.40 |
| Ratio 4 | 1.72 | 0.68 | 96.31 | 70.20 |
| Ratio 5 | 1.73 | 0.65 | 96.57 | 70.82 |
| Ratio 6 | 1.84 | 0.79 | 92.62 | 62.50 |
| Ratio 7 | 1.96 | 0.81 | 88.55 | 58.45 |

In summary, it can be seen that the seawater desalination reverse osmosis membrane with both water flux and boron removal rate prepared by the embodiment 1~7 of the invention has better comprehensive performance, the pure water flux can reach 2.03 Lm$^{-2}$h$^{-1}$bar$^{-1}$, the simulated seawater flux can reach 0.80 Lm$^{-2}$h$^{-1}$bar$^{-1}$, the desalination rate of the simulated seawater can reach 98.14%, and the boron removal rate of the simulated seawater can reach 82.46%, which is generally higher than that of the seawater desalination reverse osmosis membrane without carbon nitride modification prepared by the ratio 1~7.

The above is only the preferred implementation method of the invention. It should be pointed out that for ordinary technicians in the technical field, some improvements and embellishments can be made without breaking away from the principle of the invention. These improvements and embellishments should also be regarded as the scope of protection of the invention.

What is claimed is:

1. A preparation method thereof for seawater desalination reverse osmosis membrane with both water flux and boron removal rate, comprising the following steps:
    (1) after mixing a carbon nitride sol and deionized water, obtaining a carbon nitride solution by a first stirring, wherein,
    the carbon nitride sol is obtained by alkali treatment of the carbon nitride, the alkali treatment comprising: mixing powdered carbon nitride with sodium hydroxide solution with the concentration of 3 mol/L to obtain mixed solution with the concentration of 25 mg/mL of the carbon nitride, heating and stirring the mixed solution for 12 h at 60° C. and carrying out ultrasonic treatment for 1 h every 3 h, subjecting the mixture obtained by heating and stirring into a 3500 Da dialysis bag, changing water for a plurality of times, dialyzing for a plurality of days to neutrality to obtain the carbon nitride sol with specific concentration through the calibrated content;
    (2) mixing the carbon nitride solution obtained by the step (1) with m-phenylenediamine aqueous solution and sodium hydroxide, and obtaining an aqueous solution by a second stirring, wherein the concentration of carbon nitride in the aqueous phase solution in the step (2) is 100-500 mg/L, the concentration of sodium hydroxide in the aqueous phase solution is 0.1 wt %-1.0 wt %;
    (3) after mixing trimesoyl chloride and organic solvent, obtaining an organic liquid phase by a third stirring;
    the steps (2) and (3) can be in any order, irrespective of any sequence;
    (4) immersing a reverse osmotic basement membrane into the aqueous solution obtained by the step (2), and then removing the immersed reverse osmotic basement membrane, rolling dry surface solution with a rubber roller, then immersing into the organic liquid phase obtained in step (3) for interfacial polymerization, and obtaining the reverse osmotic basement membrane after interfacial polymerization; and
    immersing the reverse osmotic basement membrane after interfacial polymerization in a n-hexane solvent for standing, and then performing heat treatment and cooling in turn to obtain a seawater desalination reverse osmosis membrane with both water flux and boron removal rate.

2. The preparation method thereof according to claim 1, wherein a first stirring time in step (1) is 50~130 min, a first stirring temperature is 10~30° C., and a first stirring speed is 800~1,500 rpm.

3. The preparation method thereof according to claim 1, wherein a concentration of the carbon nitride solution in step (1) is 1,000~10,000 mg/L.

4. The preparation method thereof according to claim 1, wherein in step (2), a concentration of m-phenylenediamine in the aqueous solution is 0.1 wt %~4.0 wt %.

5. The preparation method thereof according to claim 1, wherein a concentration of trimesoyl chloride in the organic liquid phase in step (3) is 0.1 wt %~0.5 wt %.

6. The preparation method thereof according to claim 1, wherein, in step (4), the reverse osmotic basement membrane is a polysulfone ultrafiltration membrane or a polyethersulfone ultrafiltration membrane, wherein a molecular weight cut-off of the reverse osmotic basement membrane is 30 kDa~150 kDa.

7. The preparation method thereof according to claim 1, wherein in the step (4), firstly immersing the reverse osmotic basement membrane in the aqueous solution for 1~4 min, and then taking the immersed reverse osmotic basement membrane out, rolling dry surface solution with the rubber roller, and then immersing in the organic liquid phase for interfacial polymerization reaction for 0.5~2 min.

8. The preparation method thereof according to claim 1, wherein a temperature of heat treatment in step (4) is 90~110° C., and a time of the heat treatment is 2~5 min.

* * * * *